United States Patent Office 2,743,270
Patented Apr. 24, 1956

2,743,270
HETEROCYCLIC NITROGEN COMPOUNDS

Frederick F. Blicke, Ann Arbor, Mich., assignor to The Regents of the University of Michigan, Ann Arbor, Mich., a corporation of Michigan No Drawing. Application May 26, 1954,
Serial No. 432,583

1 Claim. (Cl. 260—239)

My invention relates to novel chemical compounds having therapeutic value and to salts of the parent compounds. More particularly, my invention relates to novel N,N',N,N'-diethylene- and N,N'-ethylene-N,N'-trimethylene-diethyliminium-polymethyleniminium quaternary hydroxides and to N,N',N,N'-diethylene- and N,N'-ethylene-N,N'-trimethylene-morpholinium - polymethyleniminium quaternary hydroxides, and to the salts of these bases.

The compounds of my invention consist of the novel cations of the formula:

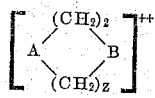

in which Z can be one of the integers 2 or 3, A can be N-diethyliminium or N-morpholinium and B can be N-pentamethyleniminium, N - hexamethyleniminium, N-(methylhexamethyleniminium), N - heptomethyleniminium or N-octomethyleniminium, associated with an anionic residue to satisfy the valence requirements. The parent compounds, or quaternary hydroxides, of my invention consist of the above divalent cations associated with two hydroxyl ions. The salts of my invention consist of the above divalent cations associated with two monovalent anions such as chloride, bromide, benzoate or picrate ions and the like or, alternatively, the divalent cations can be associated with a single anion such as a sulfate, maleate, tartrate, or succinate ion and the like. Other anionic residues such as citrate and the like can also be used by varying the cation-anion ratio to satisfy the valence requirements.

The salts of the present invention are prepared by reacting the ethylene - diethylamine - N' - polymethylenimines which are disclosed in my copending application Serial No. 432,581, filed May 26, 1954 with ethylene or trimethylene dihalides. The reaction can be illustrated by the following equation

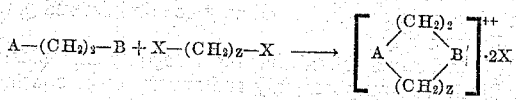

in which A, B and Z have the same significance as in the generic formula above and X represents a halide ion such as chloride or bromide. The parent compounds of my invention, i. e., the quaternary hydroxides, can be prepared from the above salts by conventional methods, e. g., treatment of the salt in aqueous solution with silver oxide. The equations below illustrate the complete structural formulae of typical reactants and products.

1.

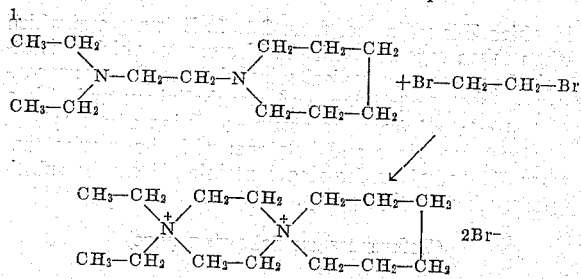

2.

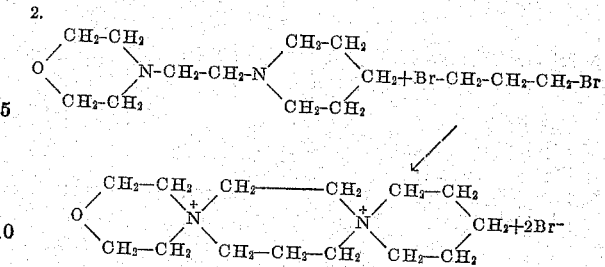

The following examples will serve to illustrate the invention.

EXAMPLE I

N,N',N,N' - diethylene - diethyliminium - hexamethyleniminium dibromide

A mixture of 0.03 mole of ethylene-N-diethylamine-N'-hexamethylenimine (B. P. 122–126° C. 14 mm.) and 0.035 mole of 1,2-dibromoethane and 75 ml. of isopropyl alcohol was refluxed for about 24 hours, then cooled and filtered. The precipitate recovered was dissolved in a few ml. of water, decolorized with activated charcoal, and reprecipitated with isopropyl alcohol. The desired product, after drying at 110° C., had a melting point of 296–298° C. (decomposition).

The dipicrate was obtained by adding aqueous picric acid to a concentrated aqueous solution of the quaternary dibromide until precipitation ceased. The dipicrate was purified by recrystallization from aqueous acetone and had a melting point of 291–292° C. (decomposition).

EXAMPLE II

N,N' - ethylene - N,N' - trimethylene - diethyliminium-octamethyleniminium dibromide A mixture of 0.03 mole of ethylene-N-diethylamine-N'-octamethyleneimine (B. P. 141–144° C. 13 mm.) and 0.035 mole of 1,3-dibromopropane and 75 ml. of isopropyl alcohol was refluxed for about 24 hours, then cooled and filtered. The precipitate recovered was dissolved in a few ml. of water, decolorized with activated charcoal, and reprecipitated with isopropyl alcohol. The desired product, after drying at 110° C., had a melting point of 272–273° C. (decomposition). The dipicrate obtained as above melted at 233–235° C. (decomposition).

EXAMPLE III

N,N',N,N' - diethylene - diethyliminium - heptamethyleniminium dibromide

This product was prepared in accordance with Example I by reacting 1,2-dibromoethane with ethylene-N-diethylamine-N'-heptamethyleneimine (B. P. 129–134° C. 11 mm.). The desired product had a melting point of 296–298° C. (decomposition). The dipicrate had a melting point of 228–230° C. (decomposition).

EXAMPLE IV

N,N',N,N' - diethylene - diethyliminium - octamethyleniminium dibromide

This product was prepared in accordance with Example III employing ethylene-N-diethylamine-N'-octamethyleneimine. The desired product had a melting point of 280–281° C. (decomposition). The dipicrate had a melting point of 252–253° C. (decomposition).

EXAMPLE V

N,N' - ethylene - N,N' - trimethylene - diethyliminium-hexamethyleniminium dibromide This product was prepared in accordance with Example II by reacting 1,3-dibromopropane with ethylene-N-diethylamine-N'-hexamethylenimine. The desired product had a melting point of 282–284° C. (decomposition). The dipicrate had a melting point of 231–233° S. (decomposition).

EXAMPLE VI

*N,N' - ethylene - N,N' - trimethylene - diethyliminium-heptamethyleniminium dibromide*

This product was prepared in accordance with Example V employing ethylene-N-diethylamine-N'-heptamethylenimine. The desired product had a melting point of 282–284° C. (decomposition). The dipicrate had a melting point of 235–237° C. (decomposition).

EXAMPLE VII

*N,N' - ethylene - N,N' - trimethylene - diethyliminium-(4-methyl-hexamethyleniminium) dibromide*

This product was prepared in accordance with Example V employing ethylene-N-diethylamine-N'-(4-methyl-hexamethylenimine) (B. P. 136–141° C. 15 mm.). The desired product had a melting point of 285–286° C. (decomposition). The dipicrate had a melting point of 171–173° C.

EXAMPLE VIII

*N,N',N,N' - diethylene - morpholinium - pentamethyleniminium dibromide*

The reactants, ethylene-N-morpholine-N'-pentamethylenimine (0.03 mole) and 1,2-dibromoethane (0.035 mole) were charged to a reaction vessel together with 75 ml. of isopropyl alcohol and refluxed for about 24 hours. The reaction mixture was cooled and filtered to recover the precipitate. The precipitate was dissolved in a few mls. of water, decolorized with activated charcoal and reprecipitated with isopropyl alcohol. The purified product was dried in air at 110° C. and had a melting point of 296–298° C. (decomposition).

The dipicrate was prepared by adding aqueous picric acid to a concentrated aqueous solution of the quaternary dibromide until precipitation ceased. The dipicrate was purified by recrystallization from aqueous acetone to give a pure salt which melted at 292–293° C. (decomposition).

EXAMPLE IX

*N,N',N,N' - diethylene - morpholinium - heptamethyleniminium dibromide*

The procedure of Example VIII was repeated employing ethylene-N-morpholine-N'-heptamethylenimine and 1,2-dibromoethane to give the product which had a melting point of 291–292° C. (decomposition). The dipicrate was obtained as above and had a melting point of 274–275° C. (decomposition).

EXAMPLE X

*N,N',N,N' - diethylene - morpholinium - octamethyleniminium dibromide*

The product was formed by the procedure of Example VIII employing ethylene-N-morpholine-N'-octamethylenimine and 1,2-dibromoethane and had a melting point of 267–268° C. (decomposition). The dipicrate had a melting point of 280–281° C. (decomposition).

EXAMPLE XI

*N,N' - ethylene - N,N' - trimethylene - morpholinium-pentamethyleniminium dibromide*

The product was formed by the procedure of Example VIII reacting ethylene-N-morpholine-N'-pentamethylenimine with 1,3-dibromopropane and had a melting point of 329–330° C. (decomposition). The dipicrate obtained had a melting point of 271–273° C. (decomposition).

EXAMPLE XII

*N,N' - ethylene - N,N' - trimethylene - morpholinium-hexamethyleniminium dibromide*

The product was formed as above by the reaction of ethylene-N-morpholine-N'-hexamethylenimine with 1,3-dibromopropane and had a melting point of 306–308° C. (decomposition). The dipicrate had a melting point of 244–246° C. (decomposition).

EXAMPLE XIII

*N,N' - ethylene - N,N' - trimethylene - morpholinium-heptamethyleniminium dibromide*

The product was formed as above by the reaction of ethylene-N-morpholine-N'-heptamethylenimine with 1,3-dibromopropane and had a melting point of 282–283° C. (decomposition). The dipicrate had a melting point of 198–200° C. (decomposition).

EXAMPLE XIV

*N,N' - ethylene - N,N' - trimethylene - morpholinium-octamethyleniminium dibromide*

The product was formed as above by the reaction of ethylene-N-morpholine-N'-octamethylenimine with 1,3-dibromopropane and had a melting point of 279–280° C. (decomposition). The dipicrate had a melting point of 182–184° C. (decomposition).

The various other salts of my new compounds can be prepared by substitution of the anion in accordance with standard procedures. For instance, the dibromides described above can be converted to the corresponding dichlorides or sulfates by treating an aqueous solution of the dibromide with silver oxide, filtering to remove the halide precipitate, and neutralizing the filtrate which comprises an aqueous solution of the corresponding quaternary hydroxide with hydrochloric or sulfuric acid, respectively. The organic acid salts can be prepared in a like manner. The iodides can be obtained by mixing warm methanolic solutions of the chloride or bromide with a stoichiometric quantity of potassium iodide in methanol, filtering the precipitated potassium halide, and evaporating the filtrate to obtain the crude salt which may be purified by dissolution in water and precipitation with isopropyl alcohol. In a similar way reaction of a quaternary sulfate dissolved in water with a soluble barium salt such as a nitrate can be used to convert the sulfate to another desired salt.

The bases and salts of the present invention are physiologically active and are characterized, among other things, by their blood pressure lowering properties. The compounds are water soluble and may be administered parenterally or orally.

It is to be understood that the foregoing examples are for illustrative purposes only and are not to be construed as limiting the scope of the invention.

I claim:

The compounds of the formula

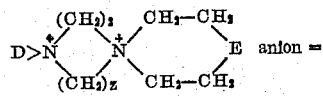

in which Z is an integer from 2 to 3; D is a group which when taken together with the N atom to which it is attached represents a radical selected from the group consisting of diethyliminium and morpholinium; and E is a radical selected from the group consisting of methylene, ethylene, propylene and butylene; with the proviso that when E is ethylene the ring containing E can be substituted with a methyl group.

(References on following page)

References Cited in the file of this patent

UNITED STATES PATENTS

| | | |
|---|---|---|
| 1,951,992 | Perkins | Mar. 20, 1934 |
| 2,261,002 | Ritter | Oct. 28, 1941 |
| 2,666,050 | Diamond et al. | Jan. 12, 1954 |

FOREIGN PATENTS

| | | |
|---|---|---|
| 439,722 | Great Britain | Dec. 12, 1935 |

OTHER REFERENCES

Fulton et al.: Proc. Roy. Soc. (London), vol. 137B, pp. 339-66 (1950).

Libman et al.: J. Chem. Soc., vol. 152, pp. 2305-7 (1952).